United States Patent
Eschbach et al.

(10) Patent No.: US 9,137,232 B2
(45) Date of Patent: Sep. 15, 2015

(54) METHOD AND SYSTEM FOR CONTROLLING ACCESS TO DOCUMENT DATA USING AUGMENTED REALITY MARKER

(71) Applicant: Xerox Corporation, Norwalk, CT (US)

(72) Inventors: Reiner Eschbach, Webster, NY (US); Raja Bala, Pittsford, NY (US); Saurabh Prabhat, Webster, NY (US); Michael R. Furst, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/154,519

(22) Filed: Jan. 14, 2014

(65) Prior Publication Data

US 2015/0200922 A1    Jul. 16, 2015

(51) Int. Cl.
  *G06K 15/00* (2006.01)
  *H04N 1/44* (2006.01)
  *H04L 29/06* (2006.01)
  *G06F 21/60* (2013.01)

(52) U.S. Cl.
  CPC ............. *H04L 63/08* (2013.01); *G06F 21/60* (2013.01); *G06K 15/4095* (2013.01)

(58) Field of Classification Search
  CPC .............. H04N 1/44; H04N 2007/145; H04N 2201/0096; H04N 2201/3245; H04N 2201/3246; H04N 1/32101; G06K 9/46
  USPC .................. 358/1.14, 1.15; 726/4; 380/243; 345/158, 633
  See application file for complete search history.

(56) References Cited

U.S. PATENT DOCUMENTS

| | | | |
|---|---|---|---|
| 6,003,011 A | 12/1999 | Sarin et al. | |
| 7,644,073 B2 | 1/2010 | Golovchinsky et al. | |
| 8,095,411 B2 | 1/2012 | Beringer et al. | |
| 8,185,587 B2 | 5/2012 | Dudley | |
| 2011/0154180 A1 | 6/2011 | Evanitsky et al. | |
| 2011/0157017 A1* | 6/2011 | Webb et al. | 345/158 |
| 2012/0050305 A1* | 3/2012 | Song et al. | 345/633 |
| 2013/0272523 A1 | 10/2013 | McCorkindale et al. | |
| 2013/0335421 A1* | 12/2013 | Franz et al. | 345/440 |
| 2014/0123237 A1* | 5/2014 | Gaudet et al. | 726/4 |
| 2014/0233917 A1* | 8/2014 | Xiang | 386/285 |
| 2014/0317049 A1 | 10/2014 | DeRoller | |

* cited by examiner

*Primary Examiner* — Benny Q Tieu
*Assistant Examiner* — Juan M Guillermety
(74) *Attorney, Agent, or Firm* — Fox Rothschild LLP (57) ABSTRACT

A document presentation system routes a document having sensitive data to various users, wherein the various users have different levels of permission to access the sensitive data. When any user displays the document on a display of an electronic device, the display will show document so that sensitive data is replaced with an augmented reality (AR) marker. The AR marker may include a descriptor of the class of data to which the sensitive data belongs. The system will also display an AR overlay for each AR marker. For each user, the AR overlay for each AR marker will include none, some, or all of the sensitive data corresponding to the AR marker. The amount of the sensitive data that will be displayed will depend on the user's authorization level.

21 Claims, 6 Drawing Sheets

10A — Name: Michael Pie

12A — DOB: 31 June 1944

14A — SS# 314-15-926

10B — Name: Michael Pie

12B — DOB: ▨▨▨▨▨ 1944

10C — Name: Michael Pie

12C — DOB: 65 and over

14C — SS# verified

FIG. 2

(a)
Name: Michael Pie
DOB: 65 & over
SS# *verified*
— 24

(b)
Name: Michael Pie
DOB: 65 and over
SS# *verified*
— 34

METHOD AND SYSTEM FOR CONTROLLING ACCESS TO DOCUMENT DATA USING AUGMENTED REALITY MARKER

BACKGROUND

In many businesses, academic and other situations, a document must be passed between multiple users for review and comment. The documents may include project workflow documents, job applications, loan or financial account applications, insurance claim documents and the like. In many cases, these documents contain sensitive information, and it is desirable to limit the number of users who can access the sensitive data.

Current systems for limiting access to sensitive data typically rely on an "all or nothing" approach. Users who are not authorized to view sensitive information may be barred from viewing any part of a document that contains that information. Alternatively, such users may receive a modified or redacted portion of the document. This process is inefficient, and it often requires creating multiple document versions. It can also require users with high authorization levels to review multiple documents in order to get all of the information that they need.

SUMMARY

In an embodiment of a method of automatically modifying a document, one or more processors will receive an instance of a document having a data field that contains sensitive data and generate an augmented reality (AR) marker so that the AR marker includes replacement content for at least some of the sensitive data and is associated with the data field. One or more of the processors will replace the data field's sensitive data with the AR marker; generate a document file that includes the document with the sensitive data removed and replaced with the data field's AR marker; and generate a data file comprising the removed sensitive data, an indicator of the AR marker, and one or more authorization levels for the removed sensitive data. The processor(s) may send the document file to a print device to be printed as a redacted document. Optionally, the method may then include using electronic device that includes a camera to capture, an image of the redacted document, analyzing the redacted document to identify the AR marker, and displaying an image of the document on a display of the electronic device, along with, in association with the identified AR marker, an AR overlay.

When displaying the image of the document along with the AR overlay, the method may include determining an authentication level for a user who is currently using the electronic device, accessing a data set containing sensitive data to identify a first sensitive data element that is relevant to the document and the AR overlay and which has an authorization level matching the authentication level of the first user, and causing the first sensitive data element to be displayed on the display as part of the AR overlay. The system may do this in response to automatic activation of the AR overlay when the AR overlay is displayed on the screen, or in response to a user activation of the AR overlay, such as by a touch screen, or voice or pointing device input.

If the system determines that the first user is no longer using the electronic device but instead a second user is now using the device, it may determine an authentication level for the second user; access the data set to identify a second sensitive data element that is relevant to the document and the AR marker, and which has an authorization level matching the authentication level of the second user; and cause the second sensitive data element to be displayed on the display as part of the AR overlay. In addition, if a different user accesses the document on a different electronic device, the method may include causing a display of the different device to display an image of the document along with an AR overlay for at least one AR marker; determining an authentication level for the different user; accessing the data set to identify an additional sensitive data element that is relevant to the document and the AR marker, and which has an authorization level matching the authentication level of the different user such that the additional sensitive data element differs from the first sensitive data element; and causing the second sensitive data element to be displayed on the display of the different electronic device as part of different electronic device's AR overlay.

In another embodiment, a method of presenting a document includes causing a display of an electronic device to display an image of a document such that some content of the document appears as an AR marker, detecting an activation of the AR marker, determining an authorization level of a current user of the electronic device, accessing a data set containing sensitive data to identify a sensitive data element that is relevant to the document and the AR marker and which has an authentication level which corresponds to the current user's authorization level, and causing the display to display the sensitive data element as part of an AR overlay on the document. Detecting an activation of the AR marker may include receiving a user selection of the AR marker, or simply displaying a portion of the document that contains the AR marker on the display.

Before displaying the document, the method may include receiving a document file for the document, wherein the document file comprises a data field that contains the sensitive data element. If so, the method may include replacing the data field's sensitive data element with the AR marker; generating a document file comprising the document with the sensitive data element removed and replaced with the AR marker; and generating a data file comprising the removed sensitive data element, an indicator of the AR marker for the data field from which the data was removed, and an authentication level for the removed sensitive data element.

Optionally, the method may include receiving a print command from the current user and causing a print device to print the document with all sensitive data redacted and replaced with one or more AR markers. Additionally, the method may include using a camera to capture an image of the document, and analyzing the image file to identify the AR marker in the document. If the current user is no longer using the electronic device, the method may include determining that a second user is using the electronic device; determining an authentication level for the second user; accessing the data set to identify a second sensitive data element that is relevant to the document and the AR marker, and which has an authorization level matching the authentication level of the second user; and causing the second sensitive data element to be displayed on the display as part of the AR overlay.

In another embodiment, a document presentation system includes an electronic display, one or more processors and a non-transitory, computer-readable medium containing programming instructions. When executed, the instructions cause one or more of the processors to cause the display to output an image of a document such that some content of the document appears as an AR marker. The processor(s) will determine an authorization level of a current user of an electronic device that includes the display; access a data set containing sensitive data to identify a sensitive data element that is relevant to the document and the AR marker, and which has an authentication level which corresponds to the current user's authorization level; and cause the display to display the sensitive data element as part of an AR overlay on the document.

Optionally, in the last embodiment noted above, one or more of the processors may be remote from and in a separate service that is in communication with the electronic device. The system may include additional programming instructions that, when executed, cause the remote processor(s) to retrieve a document file for the document, wherein the document comprises a data field that contains the sensitive data element; replace the data field's sensitive data element with the AR marker; generate a document file comprising the document with the sensitive data element removed and replaced with the AR marker; generate a data file comprising the removed sensitive data element, an indicator of the AR marker for the data field from which the data was removed, and an authentication level for the removed sensitive data element; and send the document file and the data file to the electronic device. As an additional option, the data set may be stored at a remote data storage facility that is in communication with the electronic device; one or more of the processors may be components of the electronic device; and the instructions may cause one or more of the processors to, before the displaying, retrieve a document file for the document, wherein the document comprises a data field for the sensitive data element but not the sensitive data element itself.

Optionally, the system may include a print device and additional programming instructions that, when executed, cause one or more of the processors to, in response to receiving a print command, cause the print device to print the document with all sensitive data redacted and replaced with one or more AR markers. As an additional option, the display may be a component of a portable electronic device that also includes a camera. The programming instructions may include additional instructions that, when executed, cause one or more of the processors to both cause the camera to capture an image file of the document and analyze the image file to identify the AR marker.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the term "electronic device" refers to a device or set of devices that includes one or more processors and one or more tangible, computer-readable memory portions. The memory may contain programming instructions that, when executed by any of the processors, cause the device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like.

When this document uses the term "sensitive data" or "sensitive information," it intends to refer to any information that is prohibited by law, rule, or public or private policy from being shared with any individual who is not authorized to review the information. Examples of sensitive information include personally identifiable financial information, information that qualifies as protected health information under applicable laws. Sensitive information can also include confidential business information (such as pricing data or confidential contract terms), trade secrets and confidential process descriptions.

In this document the term "credential" refers to one or more transaction-enabling forms of identification that enable a system to identify an electronic device user, and/or an electronic device. Examples of credentials include combinations of account numbers and passwords, biometric identifiers, voice recognition, call-and-response sequences or tokens such as private keys. The system may compare the credential to determine a level of authorization for the user. The level of authorization is a characteristic to determine what services or data that the system will permit the user and/or device to use and/or access.

The figures and associated discussion below describe an embodiment of a method and system whereby sensitive information in an electronic document may be replaced with class data and augmented reality markers. The system may be implemented by one or more electronic devices having a display, a computer-readable memory and one or more processors that implement programming instructions to perform the described steps. The system may be contained within a single electronic device. Alternatively, the display may be part of a first electronic device, while some or all of the processing and memory elements may be part of a second electronic device or set of devices, such as in a cloud-based system. Additional description of elements that may be included in electronic systems are described in the context of FIGS. 5 and 6 below.

Figure 1:
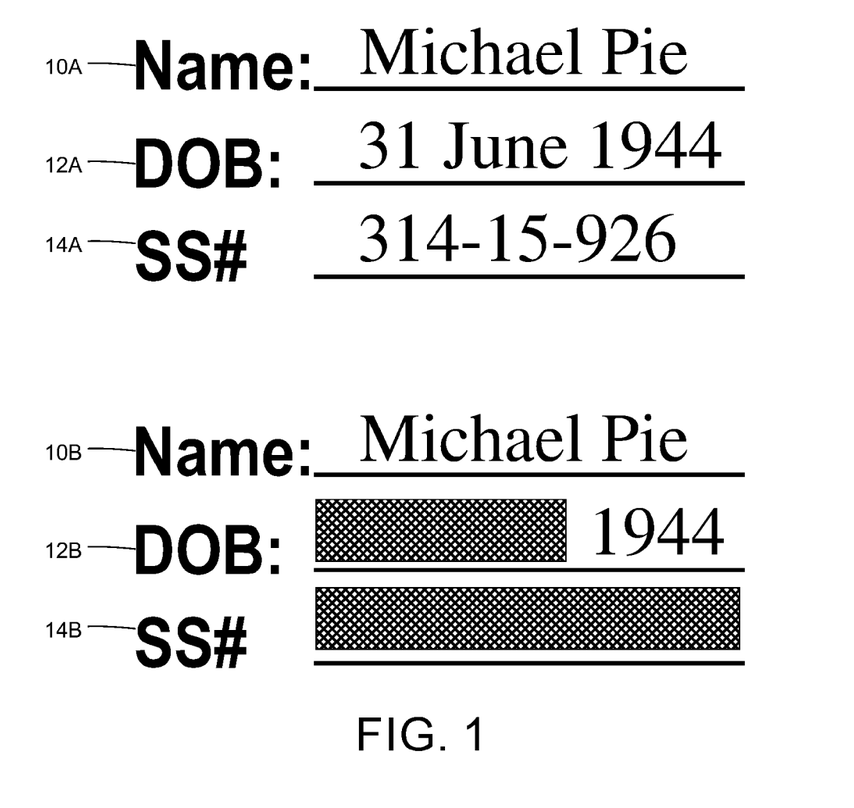
FIG. 1 illustrates a simple example of a document data field containing sensitive information, and how such a data field may be modified through redaction.

FIG. 1 illustrates a simple example of how a document having sensitive information is typically modified in the prior art through redaction so that unauthorized individuals cannot view the sensitive information. Referring to FIG. 1, a printed or electronic document may include a data field having various data elements. In this case, referring to the upper version of the field in FIG. 1, the fields include name 10A, data of birth 12A and Social Security number 14A. Before the document is routed to other users, fields containing sensitive data such as personally identifiable information, or certain subsets thereof, may be partially or fully redacted. The information remaining on the document is "open," or not sensitive and thus permitted to be distributed to a group of users who may be associated with a variety of security levels. For example, the lower embodiment in FIG. 1 illustrates that the date of birth may be partially redacted by removing the month and date from the date of birth field 12B, while the entire Social Security number may be fully redacted from its corresponding field 14B.

During the redaction process, the system may store the sensitive data as a data set in a file with the electronic version of the document. Alternatively, the system may store the sensitive data in a data set that is part of a separate file or database, in association with one or more user authorization levels. The system may retrieve this information later when a user having a corresponding authorization level is working with the redacted document. Storage of the sensitive data in one or more separate files and/or facilities may also provide the additional advantage of preventing the sensitive data to be distributed—even in encrypted or otherwise secure form—to unauthorized users. It may also allow the data files for distributed documents to be smaller, while large data sets may be stored in one or more local or cloud-based storage facilities.

Figure 2:
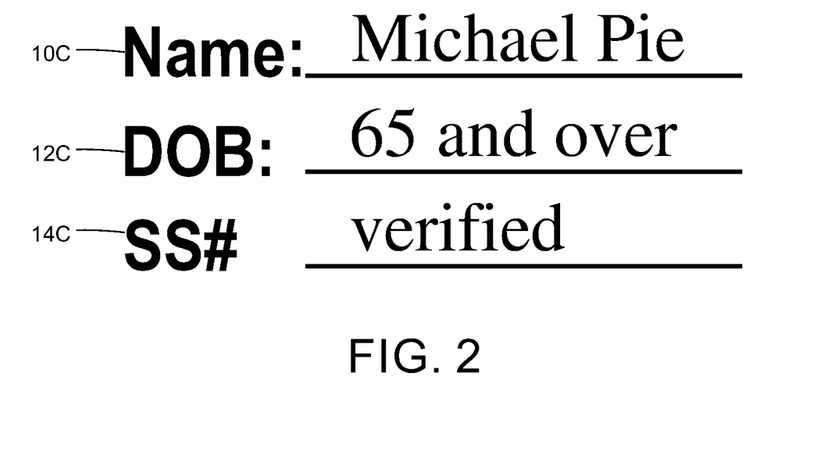
FIG. 2 shows the data field of FIG. 1, with some of the sensitive information is replaced with a class description.

FIG. 2 illustrates an embodiment where at least some of the sensitive information is replaced with a class description. A class is description is one or more words and/or numbers that provide descriptive information about the underlying data without revealing the exact value of the underlying data. For example, referring to both FIG. 1 and FIG. 2, in FIG. 2 certain of the person's personally identifiable information (date of birth) has been replaced with a more general class description that describes a class into which the sensitive data falls. In this case, the person's name 10C is kept intact. However, rather than revealing the true birthdate, the document instead displays a class 12C that is consistent with the actual sensitive data. For example, in this case "over 65" is a class to which the person's birthdate belongs. Similarly, rather than revealing the person's Social Security number, the document simply displays that the person's Social Security number has been "verified" and that the Social Security number is part of a verified class 14C of data.

Optionally, for any given document or set of documents, the system may include classes that are defined in a multi-layered fashion, with different layers being accessible at different degrees of user privilege and authentication. For example, in a system were users are assigned an authentication rank on a scale of 1 to 5 (with 5 being full authorization and 1 being least), a field may be fully redacted with a very general class description when displayed to a user having a rank of 1; a less general description may be presented to a user having a rank of 2; and some (but not all) of the underlying data may be displayed to a user having a rank of 3. Applying this to a "Date of Birth" data field, a user having a lower rank may be shown a broad age category (e.g., "child" or "adult"); while a user with a moderate authorization level may be shown a range (e.g., "age 30-35"); a user with the next higher level of authorization may be shown the year (but not month or day) of birth; and a user with the highest authorization may be shown the full date of birth. As another example, a financial account number field may have a generally defined class as account type (e.g., checking/savings/annuity), a moderate class with a partial sequence of the account number, and a high authorization user class as the full sequence.

Figure 3:
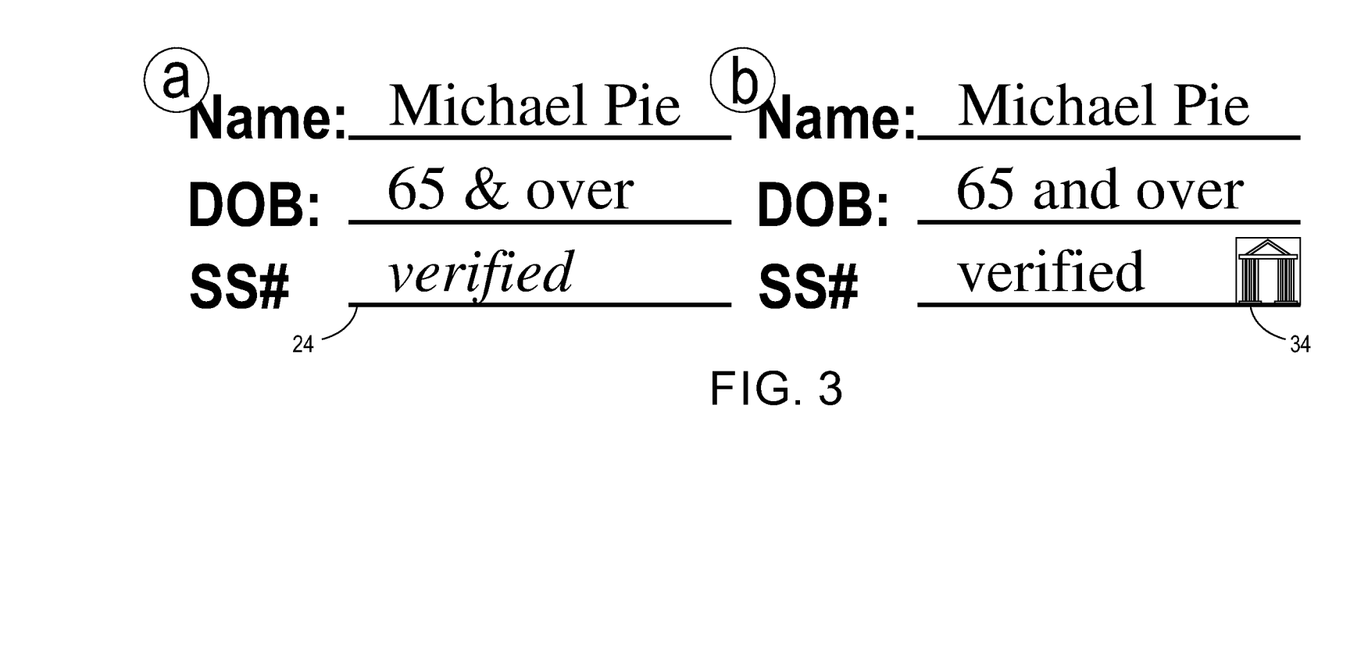
FIG. 3 illustrates how a document presentation system may add an augmented reality (AR) marker to a sensitive data field.

The image of FIG. 2 is more pleasing to the eye than the typical strikeout type redaction. However, it still does not provide a way to convey the underlying information to viewers who have authorization to access it. FIG. 3 illustrates an example of how the system may add an augmented reality (AR) marker to a sensitive data field. As used in this document, the term "AR marker" refers to an alteration of presented content that signals the user that the presented content corresponds to a class that is representative of AR data. AR data is data that is not displayed in the document to all users, but when the AR marker is selected, the system will determine what data the user is permitted to access, and it will display the authorized data to the authorized user in an AR overlay on the document near the AR marker. An AR overlay is a graphic place holder that does not ordinarily appear in a printed or displayed document unless and until a user activates it by selecting an AR marker. Examples of AR overlays include a pop-up, a word balloon or the like, such as the AR overlay pop-up 40 shown in FIG. 4.

In the examples shown in FIG. 3, the first AR marker 24 is represented by a variation in font size and script (e.g., larger, italics). The second AR marker is a symbol 34 that appears near the class data. Note that each AR marker can be any visual element that is recognized by the system as a marker. For example, each AR marker chosen from a set of known visual elements that the system maintains in a knowledge base so that, when the visual element is detected, the system recognizes it as an AR marker. In the exemplary case of FIG. 3, an icon symbolizing a government building was used.

Note that the uniqueness of the AR marker may be maintained even if the precise class level or data in the field is changed. In addition to font attribute modifications, other variants of markers can be used, such as use of color, icons, graphics or images that are visually distinct as compared to the same characteristics of the remaining text and content, as well as thesaurus-based text modifications, e.g.: "over 65" vs. "senior"; or "Dec." vs. "December". Separate AR markers may be provided for each data field (such as a font attribute modification for a data field of interest), or a single AR marker may serve to retrieve and present additional data for multiple data fields.

Figure 4:
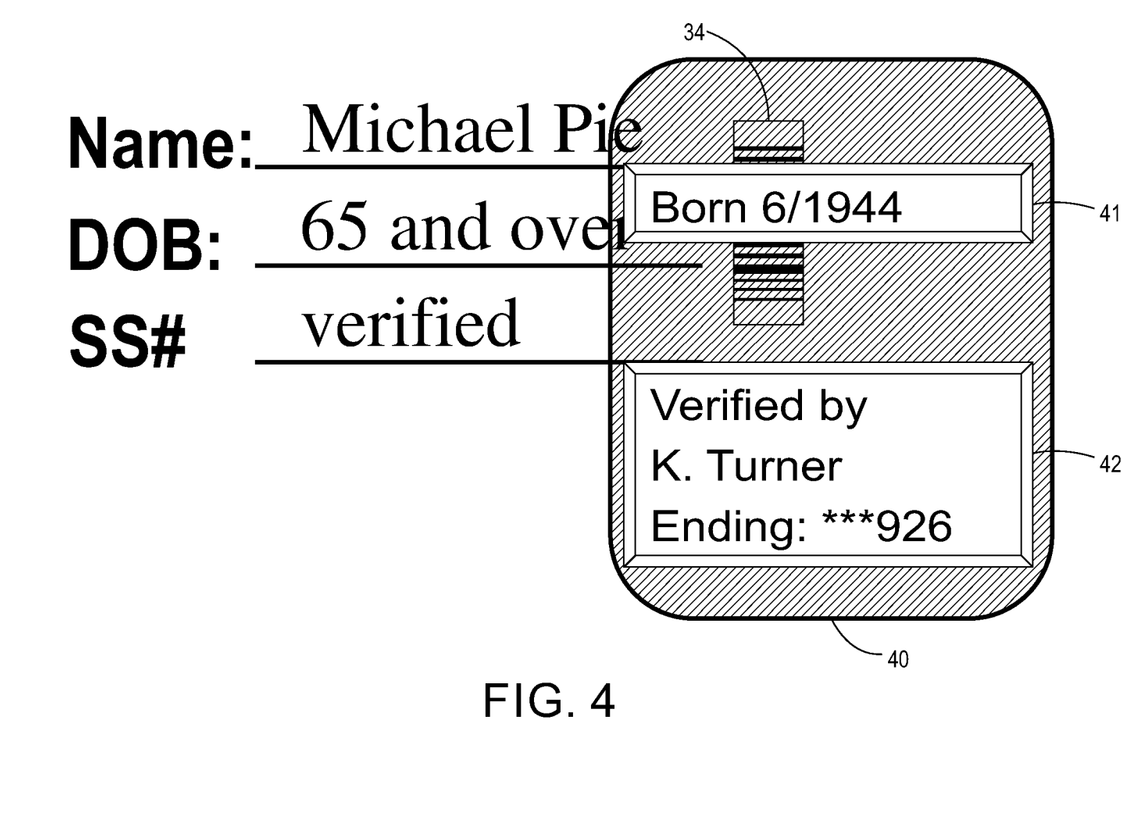
FIG. 4 illustrates an example of an AR overlay in a document presentation system.

To activate the AR marker on an electronic device, the device's display may output an image of the document including the AR marker. Referring to FIG. 4, when a user selects the AR marker 34 through a user input function such as by touching it on a touch screen, clicking or hovering over it with a mouse or other pointer, or activating it with a voice command, the system may launch an AR overlay 40. As noted above, the AR overlay 40 is an additional content field that (a) is hidden until activated, and (b) contains some or all of the sensitive data that was replaced by the class information. When activated, the document presentation system will determine the user's authorization level, identify which sensitive information corresponding to the AR marker 34 the user is authorized to view, and it will display the identified sensitive information in the AR overlay 40. As previously described, the sensitive information may have been stored in a one or more files and associated with one or more user authentication levels during the redaction process. In some embodiments, the system may present the sensitive information in an AR overlay on a display screen of an electronic device, but it will not permit the AR overlay and/or sensitive information to be printed when the document is printed. In other embodiments, it may permit a user to print some or all of the sensitive information depending on the user's authorization level.

When the system initiates the AR overlay 40, it may automatically display some information that does not require any special level of security. As an example, the identity of the person who verified the data may not require any specific security level and may be presented in a verification field 42. In addition, the system may display some sensitive data after determining the user's authorization level and identifying which data is associated with both the overlay and the user's authorization level. An example of such data is a more specific month and year of birth in a date of birth field 41. Optionally, the display of sensitive data also may be done automatically when the system both (i) determines the user's authentication level, and (ii) identifies an AR marker in the document that the user is accessing. In cases where a particular document includes multiple AR overlays, the AR overlays may be location dependent, so that when an AR overlay is activated it will appear in a vicinity of its corresponding AR marker.

The template of an AR overlay may be included with the electronic document file. The sensitive data may or may not be included with the file. In embodiments that provide extra security, when the system activates an AR overlay it may access an external data storage facility to retrieve data that corresponds to the specific document, AR marker and user authorization, and it may display the retrieved data in the AR overlay without adding the retrieved data to the actual document file.

To determine which data will be presented to a user in an AR overlay, the system may identify the user by requiring the user to provide the electronic device with one or more credentials, such as a password, pattern or voice or biometric identifier. The system may ask that the user enter the credential when the user first accesses the application, when the user requests access to the data, or at any other appropriate time. In addition, or alternatively, the system may identify the user's electronic device by a credential that is stored on the device, such as a key or other token. Either the user or the user's device may be referred to as a "user" for the purpose of this discussion and the claims below. The system may compare the credential to data for known users to identify the user's authorization level to view sensitive data.

Optionally, some or all of the sensitive data presented in an AR overlay may include text and or multimedia content such as images, audio or video.

Figure 5:
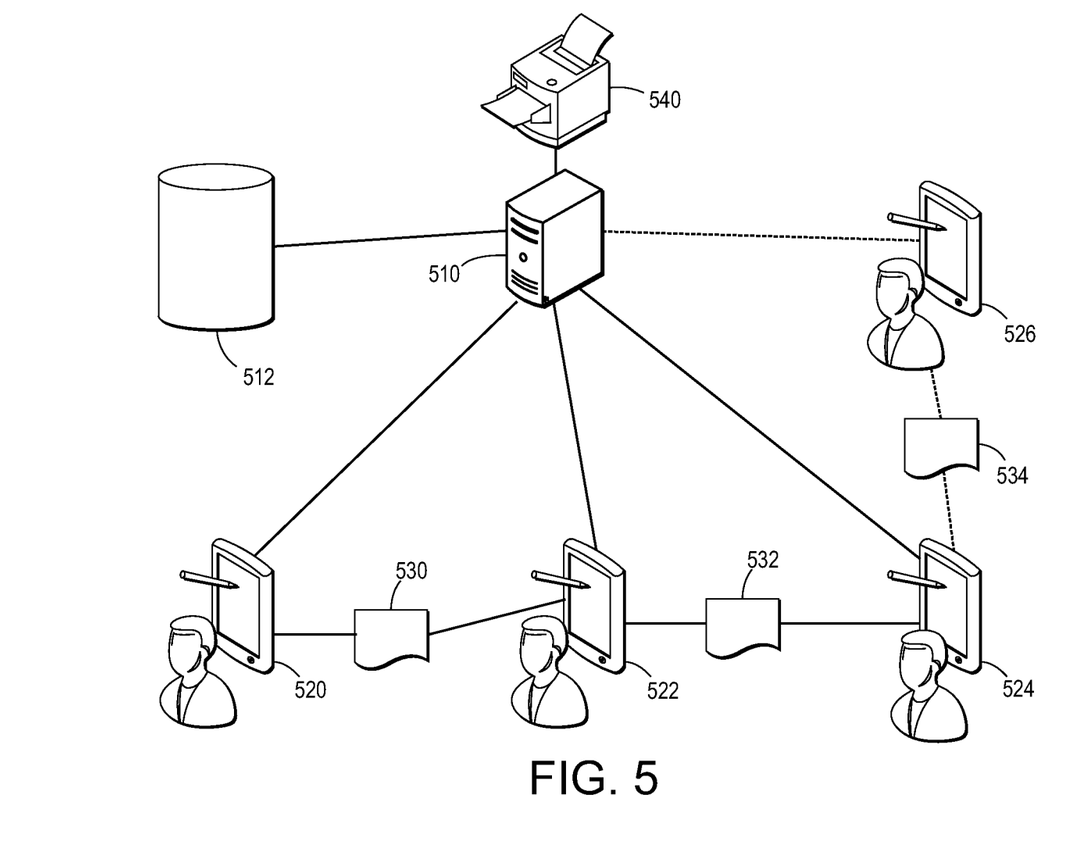
FIG. 5 illustrates various elements that may be included in a document presentation system.

FIG. 5 illustrates various elements that may be included in a document presentation system. The system includes a processor 510, which may include a set of one or more processors, such as a network server that serves as central manager for user authorization data and sensitive data selection and presentation. The processor may also monitor the progress of a document as the document passes through multiple reviewers. The processor 510 is in electronic communication with one or more data storage facilities 512 such a database or databases that contain document files, secure databases of sensitive data to be presented with document files, and user authentication information. Document files will be files containing data for an electronic document, such as a word processing document, a spreadsheet, a presentation, a chart, a media file such as one or more photos or videos, a graphic element or set of graphic elements, or any other document. The sensitive data may be stored separately from the document file, or it may be integral with the document file, such as may be the case with an encrypted file. Although the system is shown using a processor and database that serve documents and data to multiple users, in some embodiments a single electronic device may include all elements, and the device may control access to sensitive data based on which user is operating the device at the time.

The system will include various electronic devices 520, 522, 524, 526 that are used by users to view the document. Documents 530, 532, 534 may be passed between users for review and/or modification, or the processor may manage the distribution of documents directly to multiple users. The system may receive a document (such as by an image, or by an electronic document file) containing sensitive data, and replace the sensitive data with an AR marker. The system may store the document with the AR markers included (but the sensitive data removed) in a document file, and it may store the sensitive data in a separate data file. The sensitive data may be associated with one or more authorization levels, so that a lower authorization level is associated with a lesser amount of the sensitive data while a higher authorization level is associated with a higher amount of the sensitive data.

When one of the users requests access to a document file, and in particular when a user activates an AR marker on a document file, the processor 510 and/or the user's electronic device (e.g., 520) may use the user's credential to identify the device user's authentication level, the processor 510 may access the database to identify sensitive data that corresponds to the document, the AR marker, and the user's authentication level, and it may return the sensitive data to the device 520 for display to the user. In this way, different levels of sensitive data may be delivered to different devices based on the user's authentication level. Optionally, the processor 510 and/or any user's electronic device (e.g., 524) may be in communication with a printing device 540. A user of any device may command the printing device to print an instance of the document. Unless permitted by a document-specific rule or a user authentication level, the printing will be done in a manner that does not print the sensitive data on the document.

In some embodiments, when a document containing AR markers has been generated, the system may capture an image of the document, automatically identify the AR markers, and retrieve and present sensitive data that corresponds to the document, the AR markers and the user's authentication level. For example, in FIG. 5 a user may use an electronic device 522 to capture an image of a document 532 and generate an image file. Optionally, the user may enter identifying information about the document, such as a code, type or title, into the device 522. Alternatively, the device 522 may include image processing functions that automatically analyze and recognize the document based on one or more features of the document. The device may transmit the document identifier, along with the user's authentication level, to the processor 510. The processor 510 may access the database to identify the relevant sensitive data 512, and it may return that data to the electronic device. When the device 522 displays the document, it may display the sensitive data in an AR overlay whenever an AR marker of the document is activated. Note that in some embodiments, a user may be required to take action (such as touch a screen area) to activate an AR marker. In other embodiments, an AR marker may be activated automatically whenever it appears on a display (or a certain area of the display) of the user's electronic device.

Figure 6:
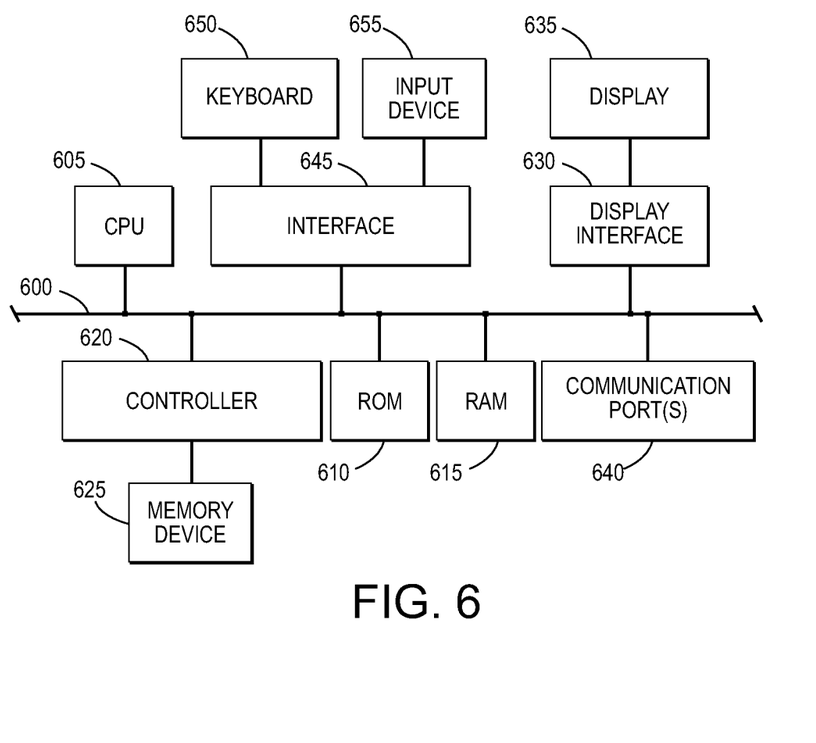
FIG. 6 illustrates various hardware elements that may be included in an electronic device.

FIG. 6 depicts an example of various hardware components that may be part of one or more electronic devices. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements disclosed in FIG. 6, is a processing device, computing device or processor as such terms are used within this disclosure. When this document uses the term "processor" or "processing device" in connection with a programming instructions or a method executed by a processor, unless specifically stated otherwise the disclosure includes both a single processor embodiment and an embodiment in which multiple processors may be available, each of which performs one of the steps.

Read only memory (ROM) 610 and random access memory (RAM) 615 constitute examples of memory devices. A controller 620 interfaces with one or more optional memory devices 625 that service as data storage facilities to the system bus 600. These memory devices 625 may include, for example, an external DVD drive or CD ROM drive, a hard drive, flash memory, a USB drive or another type of device that serves as a data storage facility. As indicated previously, these various drives and controllers are optional devices. The data storage facilities may be local, or they may be distributed as in a cloud-based system. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

The hardware may also include an interface 645 which allows for receipt of data from input devices such as a keyboard 650 or other input device 655 such as a remote control, a pointing device, a camera, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of automatically modifying a document, comprising, by one or more processors:
   receiving an instance of a document having a data field that contains sensitive data;
   selecting replacement content for the sensitive data;
   generating an augmented reality (AR) marker so that the AR marker comprises the replacement content and is associated with the data field;
   replacing the data field's sensitive data with the AR marker;
   generating a document file comprising the document with the sensitive data removed and replaced with the data field's AR marker;
   generating a data file comprising the removed sensitive data, an indicator of the AR marker, and one or more authorization levels for the removed sensitive data;
   displaying, on a display of an electronic device, an image of the document along with the AR marker with the replacement content;
   determining an authentication level for a first user who is currently using the electronic device;
   upon receiving a selection of the AR marker, accessing the data file to identify a first sensitive data element that is relevant to the document and the AR marker, and which has an authorization level matching the authentication level of the first user;
   launching an AR overlay comprising the first sensitive data element; and
   causing the AR overlay with the first sensitive data element to be displayed on the document near the AR marker.

2. The method of claim 1, further comprising, after causing the AR overlay with the first sensitive data element to be displayed on the document near the AR marker:
   receiving a request to print the document; and
   sending the document file to a print device to be printed as a redacted document so that the AR marker is printed but the AR overlay and sensitive information are not printed.

3. The method of claim 2, further comprising:
   capturing, by an electronic device that includes a camera, an image of the redacted document;
   by the electronic device, analyzing the redacted document to identify the AR marker;
   displaying, on a display of the electronic device, an image of the document along with, in association with the identified AR marker, an AR overlay.

4. The method of claim 1, further comprising:
   determining that the first user is no longer using the electronic device;
   determining an authentication level for a second user who is currently using the electronic device;
   accessing the data set to identify a second sensitive data element that is relevant to the document and the AR marker, and which has an authorization level matching the authentication level of the second user; and
   causing the second sensitive data element to be displayed on the display as part of the AR overlay.

5. The method of claim 1, further comprising:
   displaying, on a display of a second electronic device, an image of the document along with, for at least one AR marker, an AR overlay;
   determining an authentication level for a second user who is currently using the second electronic device, wherein the authentication level for the second user is different from that of the first user;
   accessing the data set to identify a second sensitive data element that is relevant to the document and the AR marker, and which has an authorization level matching the authentication level of the second user such that the second sensitive data element differs from the first sensitive data element; and
   causing the second sensitive data element to be displayed on the display of the second electronic device as part of second electronic device's AR overlay.

6. The method of claim 1, further comprising:
   displaying, on a display of the electronic device, an image of the document;
   receiving, from a user of the electronic device, an activation of the AR marker;
   determining an authorization level of a current user of the electronic device;
   retrieving one or more sensitive data elements that correspond to the activated AR marker and that have an authentication level that corresponds to the authorization level of the current user; and
   causing the retrieved one or more sensitive data elements to be displayed on the display as part of an AR overlay of the document.

7. The method of claim 1, wherein selecting the replacement content for the sensitive data comprises:
   identifying a class description that is consistent with the sensitive data; and
   selecting the class description as the replacement content.

8. A method of presenting a document, comprising, by one or more processors:
   receiving an instance of a document having sensitive data;
   selecting replacement content for the sensitive data;

generating an augmented reality (AR) marker so that the AR marker comprises the replacement content;

displaying, on a display of an electronic device, an image of the document such that some content of the document appears as the AR marker with the replacement content;

detecting an activation of the AR marker;

determining an authorization level of a current user of the electronic device;

accessing a data set containing sensitive data to identify a sensitive data element that is relevant to the document and the AR marker, and which has an authentication level which corresponds to the current user's authorization level; and causing the display to display the sensitive data element as part of an AR overlay on the document near the AR marker.

9. The method of claim 8, further comprising, before the displaying:

generating a document file comprising the document with the sensitive data element removed and replaced with the AR marker; and generating a data file comprising the removed sensitive data element, an indicator of the AR marker for the data field from which the data was removed, and an authentication level for the removed sensitive data element.

10. The method of claim 8, wherein selecting the replacement content for the sensitive data comprises:

identifying a class description that is consistent with the sensitive data; and selecting the class description as the replacement content.

11. The method of claim 8, wherein receiving an activation of the AR marker comprises one more of the following:

displaying, on the display, a portion of the document that contains the AR marker; or receiving, via a user input interface, a user selection of the AR marker.

12. The method of claim 8, further comprising:

receiving, from the current user after causing the AR overlay with the first sensitive data element to be displayed on the document near the AR marker, a print command; and causing a print device to print the document so that the AR overlay and sensitive information not printed and with all sensitive data redacted and replaced with one or more AR markers.

13. The method of claim 8, further comprising, before the displaying:

by a camera, capturing an image of the document; and analyzing the image file to identify the AR marker in the document.

14. The method of claim 8, further comprising:

determining that the current user is no longer using the electronic device;

determining that a second user is using the electronic device;

determining an authentication level for the second user;

accessing the data set to identify a second sensitive data element that is relevant to the document and the AR marker, and which has an authorization level matching the authentication level of the second user; and causing the second sensitive data element to be displayed on the display as part of the AR overlay.

15. A document presentation system, comprising:

an electronic display;

one or more processors; and a non-transitory computer-readable medium containing programming instructions that, when executed, cause one or more of the processors to:

receive an instance of a document having sensitive data;

select replacement content for the sensitive data;

generate an augmented reality (AR) marker so that the AR marker comprises the replacement content;

cause the display to output an image of a document such that some content of the document appears as the AR marker with the replacement content;

determine an authorization level of a current user of an electronic device that includes the display;

access a data set containing sensitive data to identify a sensitive data element that is relevant to the document and the AR marker, and which has an authentication level which corresponds to the current user's authorization level; and cause the display to display the sensitive data element as part of an AR overlay on the document near the AR marker.

16. The system of claim 15, wherein:

one or more of the processors are remote from and in a separate service that is in communication with the electronic device; and the system comprises additional programming instructions that, when executed, cause one or more of the remote processors to:

generate a document file comprising the document with the sensitive data element removed and replaced with the AR marker;

generate a data file comprising the removed sensitive data element, an indicator of the AR marker for the data field from which the data was removed, and an authentication level for the removed sensitive data element; and send the document file and the data file to the electronic device.

17. The system of claim 15, wherein:

the data set is stored at a remote data storage facility that is in communication with the electronic device;

the one or more processors are components of the electronic device; and the instructions comprise instructions to, before the displaying, retrieve a document file for the document, wherein the document comprises a data field for the sensitive data element but not the sensitive data element itself.

18. The system of 15, further comprising:

a print device; and additional programming instructions that, when executed, cause one or more of the processors to, in response to receiving a print command after causing the AR overlay with the first sensitive data element to be displayed on the document near the AR marker, cause the print device to print the document so that the AR overlay and sensitive information are not printed and with all sensitive data redacted and replaced with one or more AR markers.

19. The system of claim 15, wherein:

the display is a component of a portable electronic device;

the portable electronic device also comprises a camera; and the programming instructions may include additional instructions that, when executed, cause one or more of the processors to, before the displaying:

cause the camera to capture an image file of the document; and analyze the image file to identify the AR marker.

20. The system of claim 15, further comprising additional programming instructions that, when executed, cause one or more of the processors to:
- determine that the current user is no longer using an electronic device of which the display is a component;
- determine that a second user is using the electronic device;
- determine an authentication level for the second user;
- access the data set to identify a second sensitive data element that is relevant to the document and the AR marker, and which has an authorization level matching the authentication level of the second user; and
- cause the second sensitive data element to be displayed on the display as part of the AR overlay.

21. The system of claim 15, wherein the instructions to select the replacement content for the sensitive data comprise instructions to:
- identify a class description that is consistent with the sensitive data; and
- select the class description as the replacement content.

* * * * *